(12) United States Patent
Apeland et al.

(10) Patent No.: US 10,384,288 B2
(45) Date of Patent: Aug. 20, 2019

(54) UNDERWATER CONNECTION OPERATIONS

(71) Applicant: STATOIL PETROLEUM AS, Stavanger (NO)

(72) Inventors: Kjell Edvard Apeland, Sveio (NO); Jan Olav Berge, Haugesund (NO); Greg Firth, Stavanger (NO); Michael Armstrong, Stavanger (NO)

(73) Assignee: STATOIL PETROLEUM AS, Stavanger (NO)

( * ) Notice: Subject to any disclaimer, the term of this patent is extended or adjusted under 35 U.S.C. 154(b) by 363 days.

(21) Appl. No.: 15/025,133

(22) PCT Filed: Sep. 27, 2013

(86) PCT No.: PCT/EP2013/070303
§ 371 (c)(1),
(2) Date: Mar. 25, 2016

(87) PCT Pub. No.: WO2015/043669
PCT Pub. Date: Apr. 2, 2015

(65) Prior Publication Data
US 2016/0279727 A1    Sep. 29, 2016

(51) Int. Cl.
| | | |
|---|---|---|
| *B23K 9/00* | (2006.01) | |
| *F16L 1/26* | (2006.01) | |
| *B23K 9/028* | (2006.01) | |
| *B23K 9/32* | (2006.01) | |
| *B23K 101/10* | (2006.01) | |

(52) U.S. Cl.
CPC .......... *B23K 9/0061* (2013.01); *B23K 9/0284* (2013.01); *B23K 9/326* (2013.01); *F16L 1/26* (2013.01); *B23K 2101/10* (2018.08)

(58) Field of Classification Search
CPC .... B23K 9/0061; B23K 9/0284; B23K 9/326; B23K 2201/10; F16L 1/26
See application file for complete search history.

(56) References Cited

U.S. PATENT DOCUMENTS 3,207,408 A * 9/1965 Thorne ................. B23K 9/0288
219/60 R
3,880,340 A * 4/1975 Takeuchi ................. B23K 5/08
219/125.11

(Continued)

FOREIGN PATENT DOCUMENTS

EP      193812 A2 *  9/1986
EP    2 006 045 A2   12/2008
(Continued)

OTHER PUBLICATIONS

Machine translation of WO 2011/085876, Jun. 2018.*

*Primary Examiner* — Geoffrey S Evans
(74) *Attorney, Agent, or Firm* — Birch, Stewart, Kolasch & Birch, LLP

(57) ABSTRACT

There is described a method and associated apparatus for connecting a structure to equipment underwater, in particular for connecting a flange to a pipe under water. The pipe is provided under water, and a welding machine is provided in a welding space provided through a section of the pipe, and used to weld the flange to the end of the pipe, for example by internal metal inert gas welding.

9 Claims, 3 Drawing Sheets

(56) References Cited

U.S. PATENT DOCUMENTS

| | | | | |
|---|---|---|---|---|
| 4,302,652 A | * | 11/1981 | Nobileau | F16L 1/26 |
| | | | | 219/137 R |
| 4,306,134 A | * | 12/1981 | Slavens | B23K 37/0531 |
| | | | | 219/125.12 |
| 8,028,711 B2 | | 10/2011 | Ahlen et al. | |
| 2005/0251987 A1 | * | 11/2005 | Urech | B21C 37/154 |
| | | | | 29/508 |
| 2009/0166338 A1 | * | 7/2009 | Sato | B23K 9/0061 |
| | | | | 219/76.1 |

FOREIGN PATENT DOCUMENTS

| | | | |
|---|---|---|---|
| GB | 2459325 A | * | 10/2009 |
| NL | 7104071 A | | 7/1971 |
| WO | WO-2011/085876 A1 | * | 7/2011 |

* cited by examiner

UNDERWATER CONNECTION OPERATIONS

TECHNICAL FIELD

The present invention relates to underwater connection operations. In particular, the invention relates to the repair and joining of pipes or similar equipment located under water, and, in at least some embodiments, the joining of a structure such as a flange to a pipe underwater, using a welding machine.

BACKGROUND

Installing and repairing equipment in the underwater environment can be challenging. Increasingly in the oil and gas industry, hydrocarbon production and processing equipment is installed subsea, and subsea pipelines may be used for transporting hydrocarbon fluids and chemicals to and from such installations. A subsea pipeline may for example be used to transport fluids that have been recovered from the well and carry these away from the well head at an offshore location and over long distance to an onshore facility where the fluids may be processed further.

Hydrocarbon transport pipes are typically formed of steel because this is a cost-effective material. However, this material can corrode if exposed to the fluid contained inside the pipeline. The fluid in the pipeline may contain gas and liquids, including hydrocarbon gas, oil, water and/or brine. Therefore, many pipelines are provided with a thin inner lining or cladding against the steel pipe. The lining or cladding is formed of a material which does not, or is less inclined than the steel to corrode in the presence of the fluid inside the pipeline. The inner cladding is typically formed of a non-corrosive metal material. As a result, many pipelines have a bi-metallic, layered wall structure.

In the course of using a pipeline under water, it can become necessary to make modifications to the pipeline. For example, it may be desirable to join a branch or other equipment, change the layout or replace a section of the pipeline, for example if the section has become damaged or is faulty.

In order to replace or remove a section of a pipeline, the pipe needs to be cut. In the case of a bimetallic pipeline, it is cut through the outer steel layer and the cladding. A concern when installing a new section and joining the pipeline back together is how to maintain the integrity of corrosion resistance across the join.

For single metallic pipelines, options exist to mechanically connect the pipe sections by use of a mechanical connector or to mechanically attach flanges to each end for subsequent joining of the sections using the flanges. A flange may for example be clamped around the pipe end and provided with elastomeric seals between the outer surface of the pipe and the flange. There may be access for fluid to the cut in the cladding, which can be acceptable where corrosion is not an issue.

In the case of bimetallic under water pipelines, a current approach is to cut and recover the pipe ends to the surface and weld the join before replacing the joined pipeline back on the sea bed. This approach avoids exposure of the join to pipeline fluids and allows a full thickness weld to be made that maintains corrosion integrity, but can be inconvenient and difficult under adverse offshore conditions, and it may be impractical in large water depths or remote locations.

SUMMARY OF THE INVENTION

According to a first aspect of the invention, there is provided a method of connecting a flange to a pipe under water the method comprising:

(a) providing a pipe under water;
(b) providing weld means in a welding space, the welding space being provided through a section of the pipe; and
(c) using the weld means in the welding space to weld the flange to the end of the pipe.

The flange may for example be arranged adjacent to and/or connected at an end of the pipe. A joining region or weld site between the flange and the pipe, typically between the flange and an end of the pipe, may be defined.

The welding space is preferably sealed, and is preferably provided adjacent to the joining region or weld site, and/or preferably arranged in communication with the joining region or weld site, so as to provide access to perform the weld therein through the space. The space preferably comprises an inert gas atmosphere for welding.

The method may further comprise providing apparatus, typically a welding machine or equipment, under water at or near the end of the pipe to facilitate connection of the flange to the pipe. The method may further comprise moving a plugging means from the apparatus into the pipe bore, to provide a sealed welding space between the plugging means and the apparatus.

The method may further comprise injecting gas into a chamber in the apparatus to pressurize the chamber, and exert a force to move the plugging means. The injected gas is preferably inert gas, suitable for providing an inert gas welding atmosphere. The method may further comprise moving the plugging means into the pipe bore to create the inert gas atmosphere.

The method may further comprise moving the weld means between a non-operational position in the apparatus, and an operational position in which the weld means may be used to weld the flange to the pipe. In the non-operational position, the weld means may be inactive. In the operational position, the weld means may be active.

The method may further comprise attaching the apparatus to the flange. The method may further comprise moving the attached apparatus and flange to a location at or near the end of the pipe, such that the flange is located adjacent the end of the pipe. This may facilitate handling the flange to arrange the flange adjacent to the pipe. During the step of moving the attached welding machine and flange, either or both of the weld means and the plugging means may be housed within the apparatus.

The flange may comprise a ring section and the apparatus may have a tubular end section. The method may further comprise arranging the ring section and the tubular end section apparatus coaxially with an end of the pipe. An axis may be defined to extend through a section of the pipe, the ring section and the tubular end section of the apparatus. The welding space may be provided through either or both of the ring section and the tubular end section of the apparatus. The flange may be arranged between the tubular end section of the apparatus and the end section of the pipe.

The step (c) may include performing welding to produce a weld through the full thickness of the wall of the pipe to join the flange to the pipe.

The wall of the pipe at the pipe end may have a first layer formed of first metal and a second layer formed of second metal different to the first layer. In other words, the pipe may be a bimetallic pipe.

The weld means may be provided in an operational or use position or configuration, in which the weld means may be operable to weld to join the flange to the pipe. The method may further comprise removing the weld means from said position using the apparatus. The method may further comprise removing the weld means from the pipe end. The removing step may comprise locating the weld means in an apparatus attached on, at or adjacent to an end of the pipe and/or the flange. The method may further comprise detaching the apparatus from the flange and/or the end of the pipe.

According to a second aspect of the invention, there is provided a method of connecting a flange to a pipe under water, the method comprising:
(a) providing a pipe under water;
(b) providing the flange adjacent to the pipe; and
(c) directing weld means or weld energy through a region of the pipe bore, or a region that forms a part of the pipe bore of the pipe and flange when connected, so as to weld the flange to the pipe.

The method may further comprise forming a space, preferably a welding space, more preferably a sealed welding space. Said region through which the weld means is directed or provided may in this way comprise a region of the welding space.

The method of the second aspect may have further features in particular as set out in relation to the first aspect above.

According to a third aspect of the invention, there is provided a method of connecting a flange to a pipe under water, the method comprising:
(a) providing a pipe under water;
(b) providing the flange adjacent to the pipe; and
(c) using weld means at least part of which is provided within the pipe bore, or within a region that forms part the pipe bore of the pipe and flange when connected, so as to weld the flange to the pipe.

The method may further comprise forming a space, preferably a welding space, more preferably a sealed welding space. Said region through which the weld means is directed or provided may in this way comprise a region of said space.

The method of the third aspect may have further features, in particular as set out in relation to the first aspect above.

According to a fourth aspect of the invention, there is provided a welding machine for use in performing the method of any of the aspects above.

According to a fifth aspect of the invention, there is provided weld means for use in performing the method of any of the aspects above.

According to a sixth aspect of the invention, there is provided apparatus for performing the method of any of the above aspects.

The apparatus may comprise weld means or components thereof. The weld means typically comprises a weld head for performing metal inert gas welding. The apparatus may further comprise a movable mount for supporting and moving the weld head. The movable mount is preferably configured to move the weld head along an axis. The movable mount is typically configured to rotate the weld head about said axis. The movable mount may have a pivot to which the weld head may be connected to move the weld head radially of said axis.

The apparatus may have a body arranged to be attached to the flange. The apparatus is preferably configured to be arranged end-on to the end of the pipe. The apparatus may be configured to be coupled to the pipe in order to provide the weld means in an operational or use position in which the weld means is used to weld to join the flange to the pipe.

The apparatus may further comprise plugging means arranged to be moved between the apparatus and the pipe bore, when coupled to the pipe.

The apparatus may be provided with a chamber in a body of the apparatus. The chamber may be configured to be pressurized so as to move the plugging means from the apparatus into the pipe.

The chamber may have an inlet for injecting gas into the chamber to pressurize the chamber.

The apparatus may have a stowed or non-operational configuration. In the stowed configuration or non-operational configuration the weld means and/or plugging means may be stowed away in the chamber.

The plugging means may be movable into the pipe to create a welding atmosphere in said welding space, preferably comprising inert gas. The created welding atmosphere may be provided to extend through the pipe end between a region within the pipe and a region in the apparatus. The plugging means may be provided with at least one seal member arranged to bear against an inner surface of any one or more of the apparatus, flange and pipe, to provide a fluid tight seal against said surface. The plugging means may in effect separate fluid on one side of the plugging means from the weld means, and/or region through which the weld means is provided or directed to weld, and/or the operational position of the weld means, on a second side of the plugging means.

The apparatus may further comprise movement means for moving the weld means out of the apparatus to a location in the welding space, or a operational or use position in which the weld means is used, for performing the welding.

The apparatus may have a tubular section at an end of the apparatus. The tubular section may have an axis extending therethrough. The end section may be arranged to be provided adjacent the flange. The flange may be located along said axis, for allowing attachment of the apparatus to the flange.

The apparatus may have an end arranged to be provided adjacent the flange, and at least one seal member for providing a fluid seal between the said end of the apparatus and the flange.

The apparatus may have a body arranged to be sealably coupled to the end of the pipe to seal the welding space from surrounding water.

According to a seventh aspect of the invention, there is provided a flange arranged to be connected to a pipe under water by weld means, in the method of any of the first to third aspects.

The flange may be arranged to be provided at an end of the pipe. The flange may be configured to protrude outwardly from the pipe, at least once connected. For example, the flange may protrude away from an outer surface of the pipe into region surrounding the pipe, at an angle with respect to the outer surface or pipe axis, typically at a perpendicular angle. The flange may be configured to extend along and/or around a circumference of the pipe or portion of the circumference. Therefore, the flange is typically configured to match or correspond to the pipe dimensions.

Typically, the flange comprises a circumferential ring section. The ring section may be arranged to be coaxially aligned with a section of the pipe or a tubular end section of the apparatus, e.g. welding machine, coupled to an end of the pipe or the flange.

The flange may further comprise a guide sleeve for guiding the flange onto and/or into position adjacent to the end of the pipe. The guide sleeve is preferably arranged to be located around a section of the pipe. The ring section is preferably connected to the guide sleeve and protrudes outwardly with respect to the sleeve. The guide sleeve is preferably provided with a seal to seal between the guide sleeve and a wall of the pipe. Either or both of the sleeve and the ring section may be configured to define a root, e.g. comprising a backing surface or support, for the weld in a joining region or weld site between the pipe end and the flange, to allow a full thickness structural weld of the pipe wall to the flange to be performed. The root or support may be removable or detachable from the flange and/or ring section. This root or support may be used initially during the initial root welding of the flange to the pipe. The provision of a root or support can help to simplify the welding process.

The flange may be provided with a formation arranged to interfere with an end surface of the pipe when the flange is provided adjacent the end of the pipe. This helps to locate the flange in position for welding adjacent to the pipe.

According to an eighth aspect of the invention there is provided a flanged pipe obtained by performing the method of any of the first to third aspects.

According to a ninth aspect of the invention there is provided a method of connecting a flange to a pipe under water using any one or more of: the flange, the welding machine, the apparatus and the weld means, as described in any of the aspects above.

According to a tenth aspect of the invention, there is provided a method of repairing a pipeline under water, the method comprising the steps of:
(a) cutting the pipe at at least one cut location along the pipeline;
(b) performing the method of any of the above aspects, to join a flange to an end of a first section of pipe produced by cutting the pipeline in step (a); and
(c) connecting a second section of pipe to the first section by joining said second section to the joined flange of the first section.

According to an eleventh aspect of the invention, there is provided a method of connecting a structure to equipment under water, the method comprising:
(a) providing equipment under water;
(b) providing the structure adjacent to the equipment; and
(c) directing weld means or weld energy through a region of space within the equipment, or through a region that forms a part of a region of space within the equipment and structure when connected, so as to weld the structure to the equipment.

According to a twelfth aspect of the invention, there is provided a method of connecting a structure to equipment under water, the method comprising:
(a) providing the equipment under water;
(b) providing the structure adjacent to the equipment; and
(c) using weld means at least part of which is provided within a space within the equipment, or within a region that forms a part of the space within the equipment and structure when connected, so as to weld the structure to the equipment.

The equipment of the eleventh or twelfth aspects may comprise any of: a tank; pipe; container; a hollow structure; and separator. The equipment may be hydrocarbon production equipment. The structure may comprise any of: a protruding member; a structural member; a rim; a flange; a ring; and a tubular body. Thus, the equipment may comprise any of elongate, hollow, or tubular equipment. The structure is preferably provided adjacent an end of the equipment. The equipment is preferably arranged to contain fluid within said space. The space in the equipment may comprise or take the form of a bore, chamber, or passageway of the equipment or of the connected equipment and structure. The structure may comprise features as defined in relation to the flange interchangeable.

The equipment preferably has further features as described for the pipe in the aspects above and elsewhere, with the feature termed "equipment" in this aspect being interchanged with the feature termed "pipe", and the feature termed "space" being interchanged with the feature termed "pipe bore".

According to a thirteenth aspect of the invention, there is provided apparatus for use in performing the method of either of the eleventh and twelfth aspects.

The apparatus preferably has further features and is applied as described for the apparatus in the aspects above and elsewhere. In particular, the apparatus may be applied to the equipment to which the structure is to be connected, in a corresponding manner as to the pipe as described above. Thus, in particular, the apparatus may be arranged in a corresponding way to move plugging means into an end of the structure or space therewithin (instead of the bore), and to move weld means to an operational position in end of the structure or space therewithin (instead of the bore), etc.

According to a fourteenth aspect of the invention, there is provided a structure for connecting to equipment underwater.

The structure preferably has further features as described for the flange in the aspects above and elsewhere, with the feature termed "structure" in this aspect being interchanged with the feature termed "flange". In particular therefore, the structure may have a formation, guide sleeve and/or ring section and sub-features thereof, as described in relation to the flange.

The inventors have recognised various needs to be addressed for improvement relating to joining of structures to equipment, in particular flange and pipe joining operations and repair of subsea pipelines. For example, there is recognised a need for providing remotely operated subsea joining operations and repair of multi-layer metallic pipelines.

The invention provides numerous advantages as will be apparent from the description, drawings and claims.

The term "pipe bore" is used herein to refer to the tubular hollow portion of a pipe structure, where the tubular hollow portion may have cylindrical or other shapes.

Each of the aspects may include further features as set out in the claims or in the present description or the drawings in any combination. Features may be combined between any of the aspects. Each feature disclosed or illustrated in the present specification may be incorporated in the invention, whether alone or in any appropriate combination with any other feature disclosed or illustrated herein.

DRAWINGS AND DESCRIPTION

There will now be described, by way of example only, embodiments of the invention with reference to the accompanying drawings, in which.

Figure 1A:
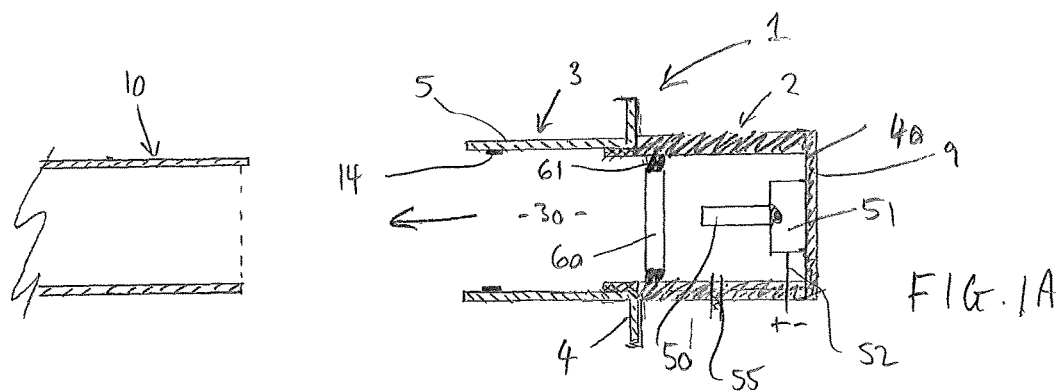
FIGS. 1A to 1E are sequential cross-sectional representations showing steps involved in the installation and joining of a flange to a pipe end according to an embodiment of the invention.

With reference firstly to FIGS. 1A to 1E, steps of a method of joining a pipe flange 3 to a pipe end 10 can be seen.

In order to perform the method, an apparatus and flange installation arrangement 1 is provided for arranging the pipe flange 3 at the pipe end 10. The pipe end in this example belongs to an underwater hydrocarbon transport pipeline which may be supported on the seabed, for transporting fluid from a well. The installation arrangement 1 comprises apparatus in the form of a welding machine 2 to which is connected a flange 3. The flange 3 has a tubular guide sleeve 5 and a flange ring 4 extending radially outward from an outer surface of the guide sleeve 5. The flange 3 defines an inner space 30 having a longitudinal axis extending therethrough, through the guide sleeve 5 and flange ring 4. The welding machine 2 may be connected to the flange 3 using any suitable connection means, for example mechanical clamps (not shown).

The welding machine 2 has a chamber 40 defined within a body therein. The welding machine 2 includes a welding head 50 and a movable mount 51 to which the welding head is movably connected. The welding head and mount are housed in the chamber 40 defined within a body portion 7 of the machine. The welding machine also includes control means 52 for providing control of the welding head and mount.

The welding machine may be remotely controlled for example by sending wireless signals or by sending signals through control cables.

In some variants, the welding machine may have welding components and a welding head arranged in a chamber of the welding machine as described for example in the patent publication U.S. Pat. No. 8,028,711.

The chamber 40 is sealed to the environment so that water cannot enter the chamber and access the components housed inside. In this respect, the welding machine has a cover 9 closing off a first, rear end of the chamber. The welding machine 2 has plugging means 60 disposed inside the body portion 7, to seal a second, front end of the chamber.

As seen in FIG. 1A, the installation arrangement 1 with the welding machine and flange connected to each other is moved under water toward the pipe end 10 to which it is sought to install the pipe flange 3. The pipe end 3 may be a cut pipe end resulting from cutting through a pipeline, for example as may be performed in a repair or joining process where a new section may need to be connected. Thus, the steps of joining of the flange to the pipe end may be performed as part of an underwater pipeline repair process. The plugging means 60 has plug seals 61, and acts to seal off the interior chamber of the welding machine from water which may enter into and reside in the guide sleeve, as the installation is moved into location for connection of the flange to the pipe end.

A manipulator, for example provided on an underwater vehicle or a handling device supported on the seabed (not shown) may be used to hold the installation arrangement and move the connected flange and welding machine into place at the pipe end. The underwater vehicle or handling device may provide an electrical supply and signal cabling to communicate with the control electronics for powering and operating the welding head.

The welding machine 2 is also configured to be supplied with pressurised gas to the chamber, and is provided with a fluid inlet 55 for doing so. The pressure and flow of the fluid, for example gas, supplied to the interior chamber can be controlled. The fluid supply may be provided on the underwater vehicle and supplied through cabling connected to the welding machine. The plugging means is movable axially from the chamber when welding is to be performed, and can be moved by generating a pressure the interior chamber such that a force is exerted against the plugging means sufficient for it to move. The supplied gas can be used to provide atmosphere suitable for welding, as well as to exert pressure on the plugging means to move the plugging means.

Figure 1B:
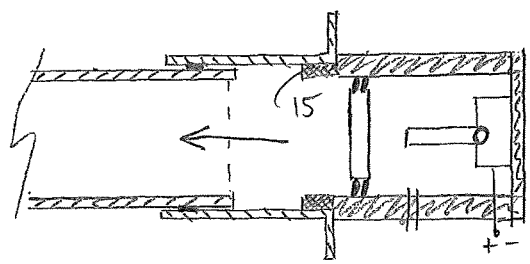
Figure 1C:
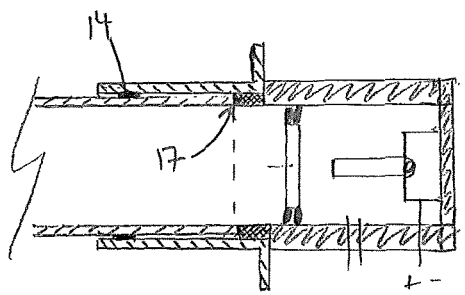

Referring to FIGS. 1B and 1C, the guide sleeve 5 is then aligned axially with the pipe end and slid onto the pipe end. The pipe flange 3 is pushed onto the pipe end until an end surface of the pipe end meets a stop surface 15 of the flange, which prevents further axial movement of the flange 3 toward the pipe end. This locates the flange adjacent the pipe end, with the guide sleeve 5 of the flange being disposed around the outside of the pipe end. The guide sleeve which lies around the outer surface 21 of the pipe end may have a seal 14 which bears against the outer surface 21 to seal therebetween.

The stop surface 15 is provided on a step formed on an inner surface of the flange. It will be appreciated that a suitable stop surface could be provided in a number of ways, by some formation, or protrusion which is connected to the sleeve and which extends inward to interfere with the pipe end so as to prevent further axial movement. Preferably, such a formation would not protrude further inwards than the thickness of the pipe wall, i.e. the inward extremity of the formation should not extend inward beyond the inner surface of the pipe end wall, so as to avoid providing any internal obstruction.

A region 17 is defined between the pipe end and the flange for performing an internal weld, using welding equipment within the pipe end and flange. In order to define a proper location for the weld, the flange wall may define a seat for the weld. For example, the seat may define a site for the weld in the region 17 that is designed to provide, upon welding, a structural fluid-tight (gas or liquid-tight) welded connection of the flange and pipe end.

Figure 1D:
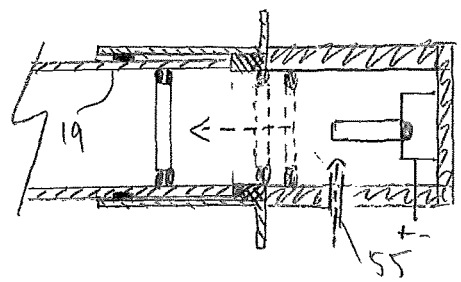
Figure 1E:
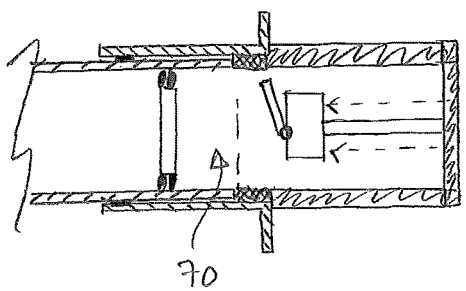

Referring now to FIGS. 1D and 1E, in order to perform the weld to join the flange to the pipe once the sleeve is located on the pipe end, the plugging means 60 inside the welding machine is moved from the welding machine body into the pipe end 10 such that the plug is located inside the pipe end adjacent the joining region 17 (i.e. to the left of the region 17). The plugging means 60 seals against an inner surface 19 of the pipe end wall, to isolate the joining region or weld site 17 from the fluid contained elsewhere in the pipeline, for example water which may have accessed the pipe end before applying the flange to the pipe end. A sealed space with a fluid volume is thereby provided which extends at least partially within the pipe bore 70 of the pipe and flange. The volume extends through the pipe bore from the pipe end, across the joining region to the flange, and communicates with the space inside the chamber 40 in which the welding head is housed.

The plugging means 60 may be moved by increasing the pressure of the fluid inside the chamber 40 in the welding machine. In particular, an inert gas may be injected through the inlet 55 to do so, such that the volume across the joining region provides an inert atmosphere in which to perform the welding. The volume is a closed volume which extends either side of the joining region. In this configuration, the flange is located ready for welding. The seal 14 seals against fluid contained in the volume to keep the volume sealed from the surrounding water. In addition, a seal may be provided to seal between connecting surfaces of the flange and the welding machine to seal the volume from its surroundings.

As seen in FIG. 1E, the welding head is then moved axially from the rear end of the welding machine into an operational position at the joining region, where it is operated to weld the flange to the pipe end through an end region of the bore 70 defined within the pipe and adjacent flange. The welding head 50 may also be moved radially and circumferentially to target the connecting parts to perform the weld. The welding head may be pivotally attached to the movable mount in order to move radially and circumferentially around the longitudinal axis. The weld may be a metal inert gas (MIG) weld, or in other variants, a tungsten inert gas (TIG) weld. The weld structurally attaches the flange to the pipe.

Once the welding is completed, the welding head is retracted back inside the chamber of the welding machine. The plug may thereafter be moved back to seal off the chamber from the pipe end, so that fluid cannot access the welding head inside the chamber.

The welding machine can then be disconnected from the flange and removed.

The flange ring 4 may then be aligned with a corresponding flange ring of a second pipe end and the respective rings may then be connected together using standard fixation methods to join them together, for example bolts, hubs and/or collet connections to form a joined pipeline. For example, the flange rings may be provided with axial holes, parallel with the pipe axis, which are aligned and through which connecting bolts may be inserted and torqued up to clamp the facing flanges together.

Figure 2:
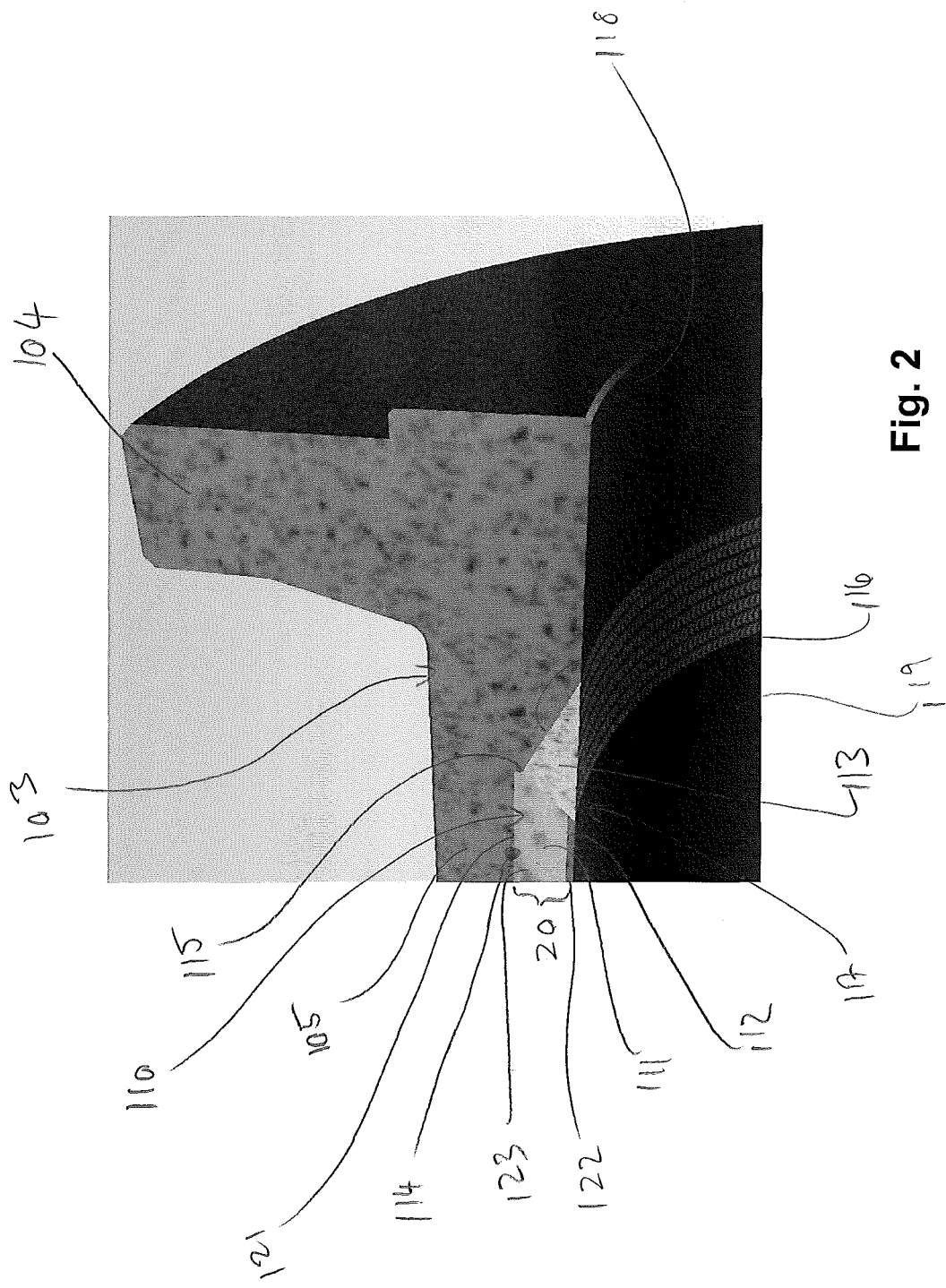
FIG. 2 is a cut-away representation showing a cross section of the pipe end and flange when joined together according to another embodiment of the invention.

With further reference now to FIG. 2, a pipe end 101 is shown with a flange 103 joined thereto, after being welded and performing steps such as those described with reference to FIGS. 1A to 1E. Components in FIG. 2 that correspond to components seen in FIGS. 1A to 1E are provided with the same reference numerals but incremented by one hundred.

The flange and pipe end has inner surfaces 118,119 which are aligned so that when the welding is performed, the weld provides a welded connection between the inner surfaces across the region 117. The welded connection provides a join between the inner surfaces which is flush with the adjacent inner surfaces 118, 119 and with the welded connection and inner surfaces 118, 119 all formed of a non-corrosive material.

As seen in FIG. 2, the pipe end has a layered wall defining a wall thickness 120. The weld may be performed so that the welded connection is achieved across the full wall thickness. The flange wall may be configured to provide a seat that allows the weld to reach from the inner surface 119 to an outer surface 121 of the pipe end. The seat in this case defines a circumferential groove around the inner surface of the flange and pipe end.

The pipe wall may have an outer layer 123 formed of steel, and an inner layer 122 formed of a non-corrosive metal different to the steel of the outer layer, i.e. bimetallic pipe. The flange may be formed of a non-corrosive metal, or may comprise an inner wall layer of a non-corrosive metal in a similar manner to the pipe end, facing inwards and defining the inner surface 118.

Figure 3:
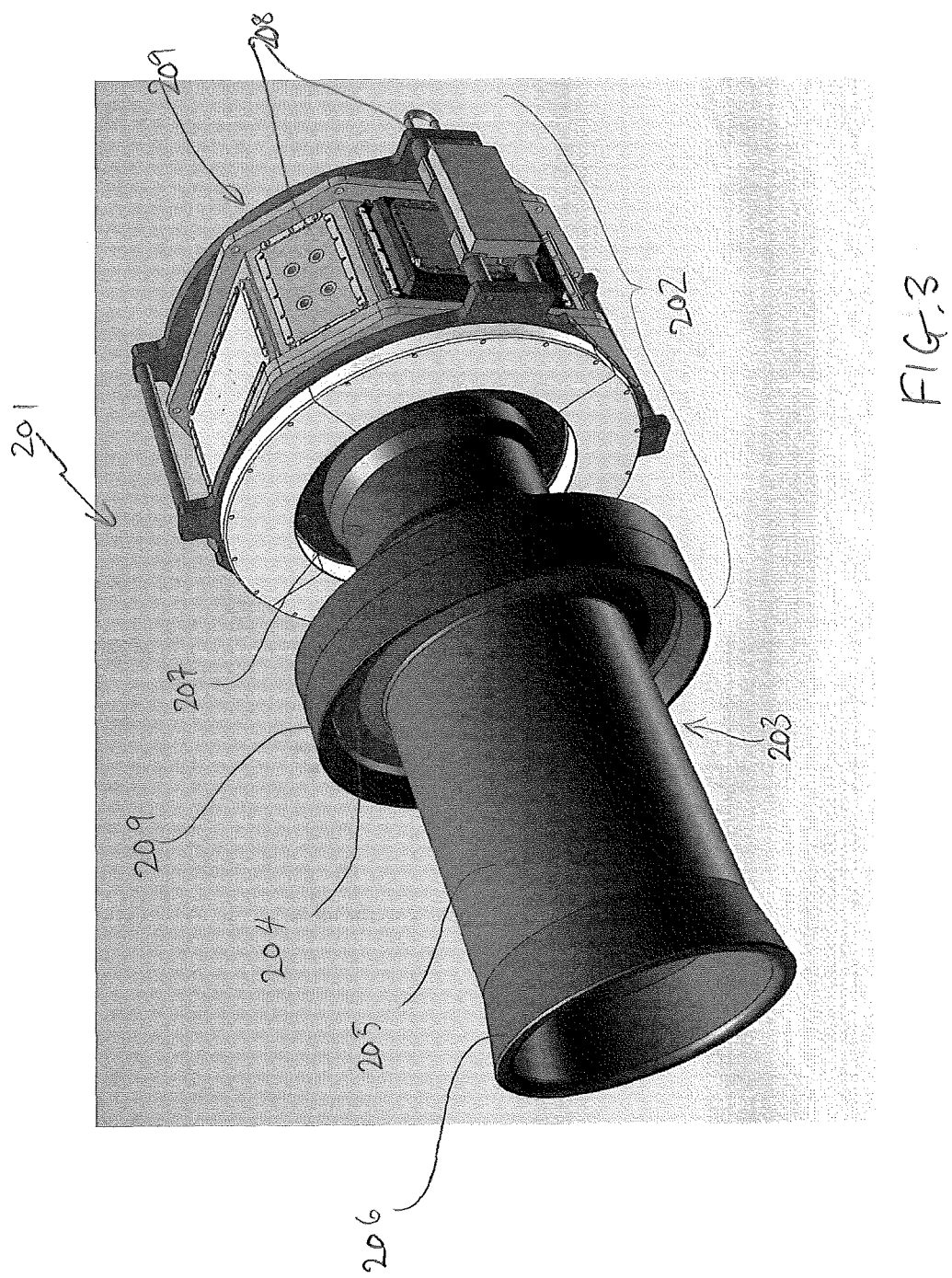
FIG. 3 is a perspective representation of an installation arrangement for joining a flange to a pipe end, according to another embodiment of the invention.

With reference to FIG. 3, a further example of an installation arrangement 201 is shown. Components that correspond to components seen in FIGS. 1A to 1E are provided with the same reference numerals but incremented by two hundred.

The welding machine has a chamber 240 inside a body portion 207 of the welding machine.

In this example, the welding machine 202 has a connection ring 209 which faces and abuts a facing surface of the flange ring 204, to facilitate connection of the welding machine to the flange 203.

The welding machine has control means including control electronics 8 for controlling and operating the welding machine. In practice, the welding machine will be provided with a water tight cover that covers and seals around the control electronics so that water cannot access and cause failure of the electrical components, although this cover is not shown in FIG. 3.

The guide sleeve 205 is provided with a flared section 206 at its leading end, having a larger inside diameter than an adjacent section of the sleeve 205 to the rear. This configuration helps to guide the flange 203 onto the pipe end 210.

In other embodiments, the flange may have a guide sleeve that is detachably connected to the flange ring, and is removable from the guide sleeve and pipe.

The invention provides therefore, a subsea/under water pipeline repair technique based on internal Metal Inert Gas welding to seal over single or multi-layer metallic pipeline ends and structurally connect flanges to the pipe ends ready for mechanically connecting the flange ends together. In other variants, Tungsten Inert Gas welding could be used.

This solution will offer a welded seal over the pipe ends and a welded improvement for flange connection to the pipeline. The weld provides a gas and liquid tight seal across the multi-layer metallic end, as may be beneficial as part of the repair for a multi-layer metallic pipeline. The flange is welded to the pipeline rather than relying on other mechanical fixing methods. It may allow remote repair multi-layer metallic pipelines in situ under water.

Various modifications and improvements may be made without departing from the scope of the invention herein described. In particular, although the technique described shows connection of a flange to multi-layer pipe, it can equally be applied to a single steel or metal, layerless, pipe. In other variants (not shown), the technique described in relation to the application of a flange on the end of a pipe, may be applied to the connection of a flange or other structure to other (but similar) kinds of underwater equipment, such as tanks, containers, or separators or the like, which may have a space therein allowing the plugging means and weld means to be applied within the space in the same manner as to the bore of the pipe, or of the pipe and adjacent flange, as described specifically above. Thus, instead of the plugging means being moved into the pipe bore, the welding machine may be used to move the plugging means into a space within the equipment, to form the sealed space having the inert weld atmosphere, and thereby join the structure to the equipment. Thus, the structure to be attached to the equipment may have a guide sleeve or similar to locate the structure on the end of the equipment, in a corresponding way to the pipe and flange described above, and may have similarly a ring section and formation to correctly align the structure adjacent to the equipment ready for welding. In particular, an installation arrangement may be used in a similar way, comprising a welding machine with the structure attached (instead of the flange) and the arrangement is maneuvered to locate the structure at the end of the equipment, for then applying the plugging means and weld means to form the connection.

The invention claimed is:

1. A method of connecting a flange to a pipe under water, the method comprising the steps of:
   providing a pipe under water;
   providing a welding machine comprising a weld head under water at or near the end of the pipe for connecting the flange to the pipe;
   attaching the welding machine to the flange and moving the attached welding machine and flange to a location at or near the end of the pipe, such that the flange is located adjacent the end of the pipe;

locating the weld head in a welding space, the welding space being provided through a section of the pipe; and using the weld head in the welding space to weld the flange to an end of the pipe.

2. The method as claimed in claim 1, wherein said welding space comprises an inert gas atmosphere for performing welding.

3. The method as claimed in claim 1, further comprising the step of moving a plugging mechanism from the welding machine into a bore of the pipe, to provide a sealed welding space between the plugging mechanism and the welding machine.

4. The method as claimed in claim 1, wherein the flange comprises a ring section and the welding machine has a tubular end section, and the method further comprises the step of arranging the ring section of flange and the tubular end section of the welding machine coaxially with the end of the pipe.

5. The method as claimed in claim 4, wherein said welding space is further provided through either or both of the ring section and the tubular end section of the welding machine.

6. The method as claimed in claim 4, wherein the flange is arranged between the tubular end section of the welding machine and the end of the pipe.

7. The method as claimed in claim 1, wherein the step of using the weld head further comprises the step of performing welding to produce a weld through a full thickness of a wall of the pipe to join the flange to the pipe.

8. The method as claimed in claim 1, wherein a wall of the pipe at the pipe end has a first layer formed of a first metal and a second layer formed of a second metal different from the first layer.

9. The method as claimed in claim 1, wherein the weld head is provided in a use position in which the weld head is operable to weld to join the flange to the pipe, and the method further comprises the step of removing the weld head from said position using the welding machine.

\* \* \* \* \*